J. ZIMMERMANN.
DIRIGIBLE HEADLIGHT.
APPLICATION FILED NOV. 3, 1913.
1,088,675.
Patented Feb. 24, 1914.
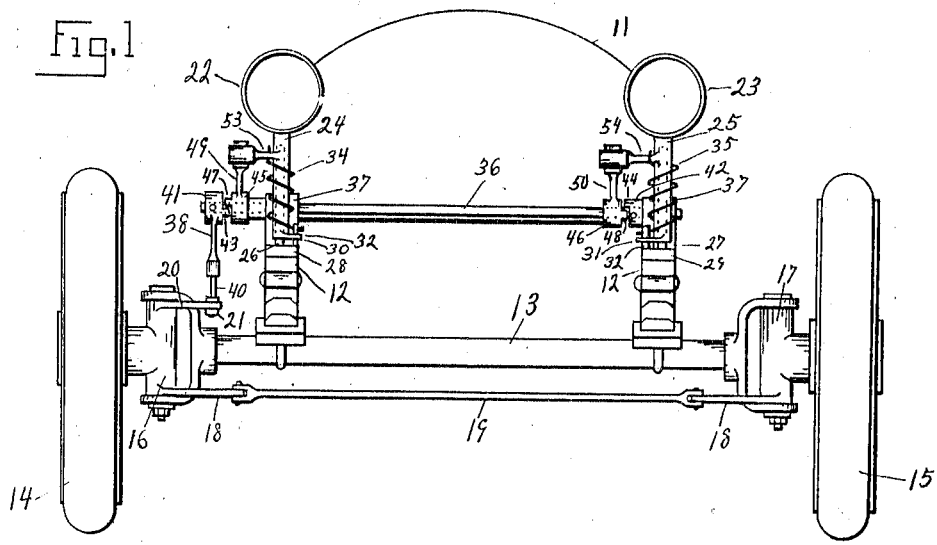
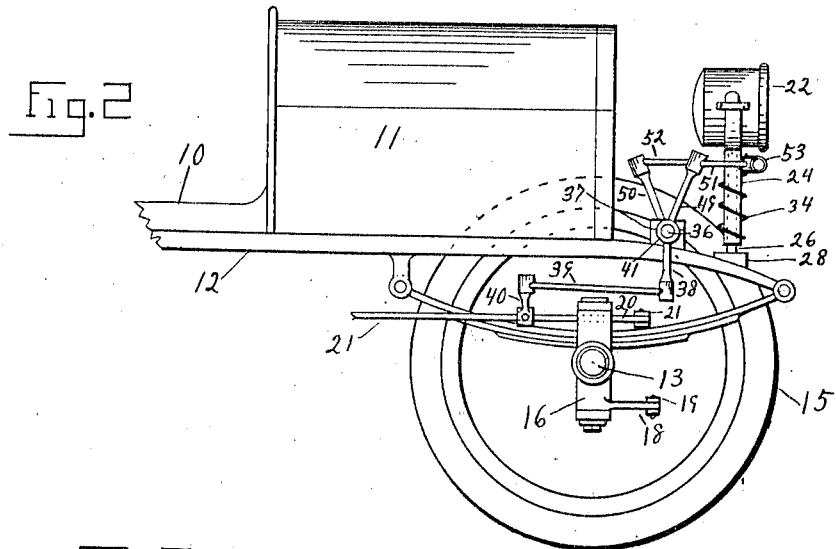
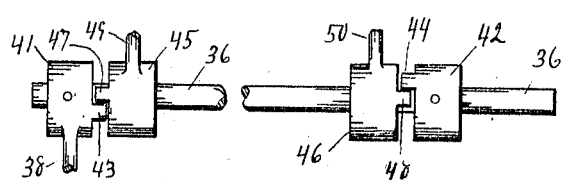
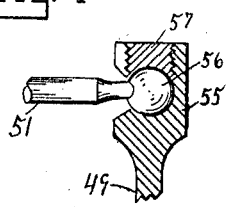
WITNESSES:
INVENTOR.
John Zimmermann
ATTORNEY.

UNITED STATES PATENT OFFICE.

JOHN ZIMMERMANN, OF LOUISVILLE, KENTUCKY, ASSIGNOR OF TWO-FIFTHS TO ROY L. CARTER, OF LOUISVILLE, KENTUCKY.

DIRIGIBLE HEADLIGHT.

1,088,675.   Specification of Letters Patent.   Patented Feb. 24, 1914.

Application filed November 3, 1913. Serial No. 798,869.

*To all whom it may concern:*

Be it known that I, JOHN ZIMMERMANN, a citizen of the United States, residing at Louisville, in the county of Jefferson and State of Kentucky, have invented a new and useful Dirigible Headlight, of which the following is a specification.

This invention relates to headlights for automobiles and similar vehicles, and has for an object to produce a simply constructed attachment whereby the headlights may be caused to follow the line of movement of the vehicle in all the changes of direction which it may pursue, one headlight following the change of direction to one side, and the other headlight following the change of direction to the other side, one headlight remaining stationary while the other is shifting.

With the foregoing and other objects in view, which will appear as the nature of the invention is better understood, the invention consists in certain novel features of construction as hereafter fully described and claimed, and illustrated in the accompanying drawing which forms a part of this application, in which is set forth an embodiment of this invention, but it is to be understood that changes, variations and modifications may be resorted to that come within the scope of the claims appended hereunto.

In the drawings, in which like reference numerals indicate like parts in the different views; Figure 1. is a front elevation of a portion of an automobile of conventional form with the improvements applied; Fig. 2, is a side elevation of the parts shown in Fig. 1; Fig. 3 is an enlarged sectional detail. Fig. 4, is a detail of a connecting joint.

My improved device may be readily adapted without material modifications to all the various forms of automobiles manufactured and to lamps of such vehicles wherever located thereon. In some forms of such vehicles the lamps are located upon the front of the hood portion, sometimes at the rear of the hood portion, sometimes upon the supporting frame, and at other points; but for the purpose of illustration the lamps in the drawings are shown mounted on the forward portion of the frame, chassis, a common practice in automobile construction. The body of the automobile is represented at 10, the hood or covering for the motive power and other parts at 11, the chassis at 12, the forward axle at 13, the forward wheels at 14 15, coupled to the axle in the usual manner by the swivel joints 16 17, the latter having lateral arms 18 coupled by a rod 19; one of the swivel joints, as 16 having a lateral arm 20 carrying the steering rod 21, the mechanism for operating which is not shown, as it forms no part of the present invention.

The lamps (represented at 22 23) are mounted in brackets on the ends of tubular stems 24 25 that fit over rods 26 27, and swivel thereon, the rods are secured in, or to, bases 28 29, that in turn are attached to the frame 12 by suitable means. Near the lower ends of the tubular stems 24 25 are lateral projections 30 31 that impinge against vertical pins 32 33 set in the bases 28 29, and limit the movement of the stems in one direction. Suitable means, such as springs 34 35 coiled around the tubular stems 24 25, are provided to hold the projections normally in contact with the pins, in this position the lamps are held parallel to the line of movement of the car in position to throw the light straight ahead.

A shaft 36 mounted transversely in bearings 37 is provided with an arm 38 that is connected by means of a rod 39 to an arm 40 attached to the steering rod 21, by reason of this connection the reciprocating movement of the steering rod communicates a rocking motion to the shaft 36. Secured on the shaft 36 are collars 41 42 each provided with a lateral projection, or finger, 43 44; on the shaft also are positioned loose collars 45 46 each having a laterally projecting finger 47 48 that may be engaged by the fingers 43 44; the arrangement being such that when the shaft 36 is moved in one direction a finger, say 43, on a fixed collar will engage the finger 47 on the loose collar 45, and when moved in the opposite direction the finger 44, on fixed collar 42, will engage finger 48, on loose collar 46.

It will be observed that the loose collars partake in the motion of the shaft, when engaged by the fixed collars, but that they move in different directions. Extending from the loose collars are arms 49 50 that are connected, by means of rods 51 52, with arms 53 54 that extend laterally from the stems 24 25. The arrangement being such that as the steering rod 21 moves forward the arm 38 is moved forward, by means of the rod 39, as the arm 38 moves forward pin 43, on the fixed collar 41, engages pin 47 on loose collar 45, moving the loose collar in unison with the shaft. As the arm 49 extends upward from the collar 45 it moves in the reverse direction to the arm 38 and by means of the connecting rod 51, and arm 53, turns the stem 24, and lamp 22 to the right, that is in the direction in which the wheels 14 15 have been turned. As the finger 43 engaged finger 47 on loose collar and shifted the same, finger 44 on fixed collar 42 moved away from the finger 48 on loose collar 46, consequently the lamp 23 was not disturbed, and the light continued to be directed straight ahead. When the steering rod 21 moves backward, to turn the wheels to the left, the finger 44 on fixed collar 42 will engage with finger 48 on the loose collar 46 shifting the same, and through the medium of arm 50, rod 52 and arm 54 shifting the lamp 23 to the left, the direction in which the wheels are turning. During this movement finger 43, on fixed collar 41, has moved away from the finger 47, on loose collar 45, and the lamp continued to direct the rays of light straight ahead, as previously described in connection with lamp 23.

In Fig. 4 is illustrated a form of flexible connection that may be used between the various parts, comprising a ball 56, held within a socket portion 55 by means of a screw plug 57.

By this simple arrangement it will be obvious that when the vehicle is moving in a straight line the lamps will be held parallel to the line of movement or in position to throw light straight ahead. If the vehicle is turned to either side, as when moving on curves, turning corners or turning the vehicle around, one of the lamps will be partly rotated, that on the side to which the vehicle is turning, causing the rays of light from the lamp to follow the path over which the vehicle is about to move, while the other lamp illuminates the path ahead.

Having thus described my invention so that any one may make and use the same I claim:—

1. In combination with a vehicle provided with front-wheel steering apparatus, of lamps carried by the vehicle, means for normally holding said lamps directed forward, a shaft mounted transversely, means connecting said shaft and said steering apparatus whereby said shaft is rocked by the movement of the steering apparatus, fixed and loose collars on the shaft, means connecting the lamps and said loose collars, and engaging members on said collars whereby when the shaft is rocked in one direction one lamp will be shifted and when the shaft is rocked in the other direction the other lamp will be shifted.

2. In combination with a vehicle provided with a front-wheel steering-gear, a support at each side of the vehicle carrying a lamp, means for holding said lamps normally directed forward, a transverse shaft, fixed and loose collars on said shaft, engaging members on said collars, means connecting said lamps and said loose collars, and connecting means between said shaft and said steering-gear.

JOHN ZIMMERMANN.

Witnesses:
W. D. MUNNELL,
J. S. LEAKE.